Sept. 22, 1959     P. SPENCE     2,905,488
FLANGED ELASTOMERIC SLEEVE TYPE FLEXIBLE COUPLING FOR PIPES
Filed Dec. 9, 1952
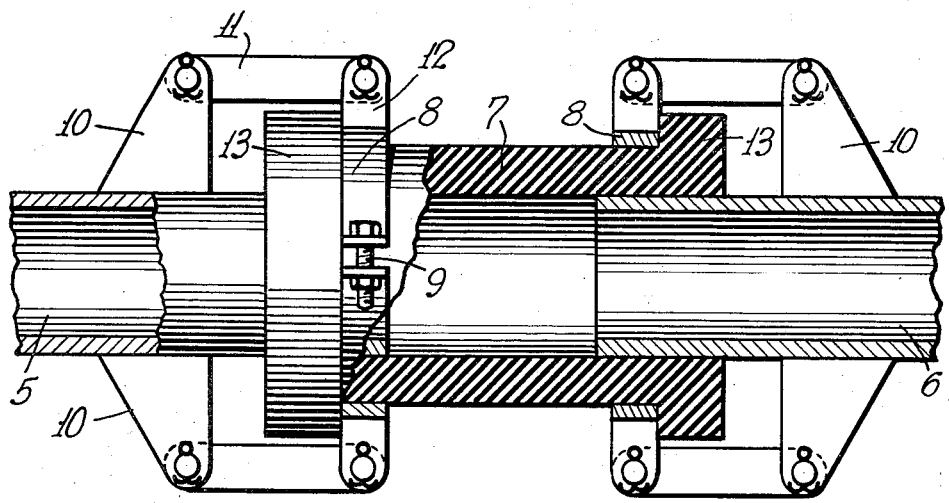
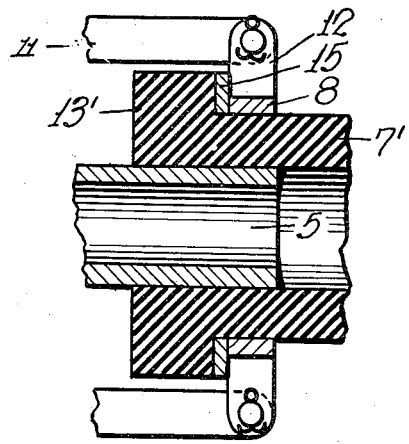
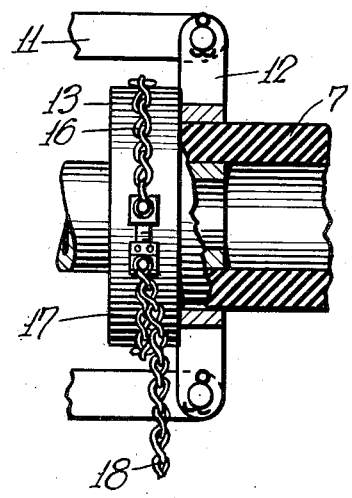
INVENTOR
*Paulsen Spence*
BY
*Mitchell Bechert*
ATTORNEYS

2,905,488

FLANGED ELASTOMERIC SLEEVE TYPE FLEXIBLE COUPLING FOR PIPES

Paulsen Spence, Baton Rouge, La.

Application December 9, 1952, Serial No. 324,919

1 Claim. (Cl. 285—236)

My invention relates to means for flexibly connecting two rigid pipe lengths together.

In heavy-duty applications, such as dredging, pipe lengths to be flexibly joined are relatively heavy and cumbersome, so that flexible couplings are subjected to enormous strains. Care must be taken at all times that the flexible coupling, which is usually a rubber-like sleeve, not only does not slip off the ends of the pipe lengths, but also that the parts are not lost when a break occurs.

It is, accordingly, an object of the invention to provide improved means for flexibly connecting two pipe lengths of the character indicated.

Another object is to provide an improved flexible-hose coupling capable of standing great abuse and wear and, at the same time, highly resistive to becoming detached from the pipe length to which it is secured.

Another object is to provide means for securing a flexible hose coupling to a pipe and at the same time for retaining a rigid anchorage to the pipe length.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is a view in partial section showing two pipe lengths secured to each other by means of a flexible connection incorporating features of the invention;

Fig. 2 is a fragmentary view showing parts of a modified flexible coupling; and

Fig. 3 illustrates a further arrangement.

Briefly stated, my invention contemplates improved means for securing a flexible hose to two rigid pipe lengths which are to be flexibly joined. My coupling includes at each location of overlap between the flexible hose and the pipe, a circumferential clamp binding the hose to the pipe, and my clamping means further includes a longitudinally rigid connection between the circumferential clamp and the pipe itself. To enhance the security of the coupling, I prefer that the sleeve be integrally formed with a flange or shoulder, to be abutted by the circumferential clamp. If desired, the inner face of this flange or shoulder may carry a wear plate, or the like, to resist chafing between the clamp and the shoulder.

Referring to Fig. 1 of the drawings, my invention is shown in application to means for flexibly joining two rigid pipe lengths 5—6 to each other. The flexible connecting means may include a hose or sleeve 7 of resilient material, such as rubber or rubber-like material overlapping the longitudinal ends of both pipe lengths 5—7. At each overlap, I employ circumferential clamping means such as a strap 8, extending around the sleeve 7 and adjustable, as at 9, to bind the sleeve securely on the adjacent pipe end. In accordance with the invention, I provide anchoring means longitudinally rigidly holding each of the clamping means 8 to its respective pipe length 5—6. In the form shown, I employ bracket means 10, welded or otherwise permanently secured to the pipe. The anchoring means preferably also includes a removable link, as at 11, connecting a part (such as the bracket 12) on clamping means 8 direct to bracket means 10. I prefer that bracket means 10 be provided at substantially uniform angularly spaced locations around the pipe lengths and, as shown, two brackets 10 are employed for each pipe length 5—6.

In order to enhance the security of the coupling, I prefer that the sleeve 7 shall integrally include shoulder or radial-flange means 13 outwardly of each clamp means 8. The shoulder 13 may be a rigid collar bonded to the sleeve 7, but I have shown the shoulder 13 to be formed integrally out of the same resilient material as that from which sleeve 7 is made.

In use, the rigid symmetrical anchorage of clamp 8 will be seen to prevent any possible working of the sleeve 7 along a pipe length, as the two pipe lengths are flexed at the coupling. This will be true regardless of the magnitude or asymmetry of the load applied and, if any break is to occur, this will take place in the sleeve 7 itself and will not be due to any weakening or loss of the sleeve ends at the point of overlap with the pipe lengths.

In Fig. 2, I illustrate a slightly modified arrangement which may lend itself to more rugged applications than that described in Fig. 1. The principal difference between the two constructions lies in the provision of wear-resistant means 15 between the clamp 8 and the shoulder 13' on sleeve 7'. The wear-resistant means 15 may be a loose steel or other metallic washer, but I prefer that the means 15 shall be intimately bonded to the shoulder or flange 13'.

In Fig. 3, I illustrate how the holding efficiency of either of the devices of Figs. 1 and 2 may be further improved by circumferential clamping means 16 around each of the flanges 13. The clamping means 16 is shown to be an adjustable chain clamp involving a length of chain having a free end hooked or otherwise secured to one member 17 of an adjustable clamp, thus leaving part of the chain free, as at 18. This free length of chain 18 may, if desired, be connected to rigid anchoring means on the other pipe length, in order to avoid loss of one pipe length should the sleeve 7 itself break, all as discussed in greater detail in my co-pending application, Serial 120,706, filed October 11, 1949.

It will be seen that I have described a relatively simple and yet highly effective means for securely clamping a flexible connection to two pipe lengths. My coupling means is extremely rugged and avoids all dangers of loss of the flexible connection due to slippage of a pipe end.

While I have described my invention in detail for the preferred forms shown, it will be understood that modifications may be made within the scope of the invention as defined in the claim which follows.

I claim:

Coupling means for flexibly connecting two rigid cylindrical pipe lengths together, comprising a sleeve of resilient material fitting over the longitudinal ends of said pipe lengths with substantial overlap thereof, first and second radially outwardly extending flange means integral with the respective ends of said sleeve and forming a circumferential radially extending shoulder at each end of said sleeve, first and second circumferentially extending clamping means in direct axial-thrust sustaining relation with the shoulder of each said flange and radially inwardly binding said sleeve to the respective ends of said pipe lengths at each overlap with said pipe lengths, the shoulders of each said flange being of radial height substantially exceeding the effective radial thickness of said clamping means, load-distributing radial washer means intermediate and axially abutting each said shoulder and the adjacent clamping means, said washer means having a bore riding the body of said sleeve and an outer diameter exceeding the effective outer diameter of the clamping means adjacent thereto, and anchoring means fixed to each pipe length and straddling the adjacent flange and positively connected to the clamping means adjacent thereto.

References Cited in the file of this patent

UNITED STATES PATENTS

| | | |
|---|---|---|
| 434,116 | Ricketts | Aug. 12, 1890 |
| 530,917 | Ames | Dec. 18, 1894 |
| 609,488 | Wood | Aug. 23, 1898 |
| 809,903 | Bowers | Jan. 9, 1906 |
| 918,514 | Dixon | Apr. 20, 1909 |
| 1,006,588 | Nicholls | Oct. 24, 1911 |
| 1,038,012 | Sobey | Sept. 10, 1912 |
| 1,218,444 | Muller | Mar. 6, 1917 |
| 1,508,023 | Moomy | Sept. 9, 1924 |
| 1,539,001 | Steeple | May 26, 1925 |
| 1,639,225 | Grace | Aug. 16, 1927 |
| 2,267,085 | Dezendorf | Dec. 23, 1941 |
| 2,356,333 | Matter | Aug. 22, 1944 |
| 2,428,652 | Cole | Oct. 7, 1947 |
| 2,534,635 | Stillwagon | Dec. 19, 1950 |

FOREIGN PATENTS

| | | |
|---|---|---|
| 236,127 | Great Britain | July 2, 1925 |
| 416,268 | Germany | July 11, 1925 |
| 628,485 | France | June 28, 1927 |